United States Patent Office 3,535,932
Patented Oct. 27, 1970

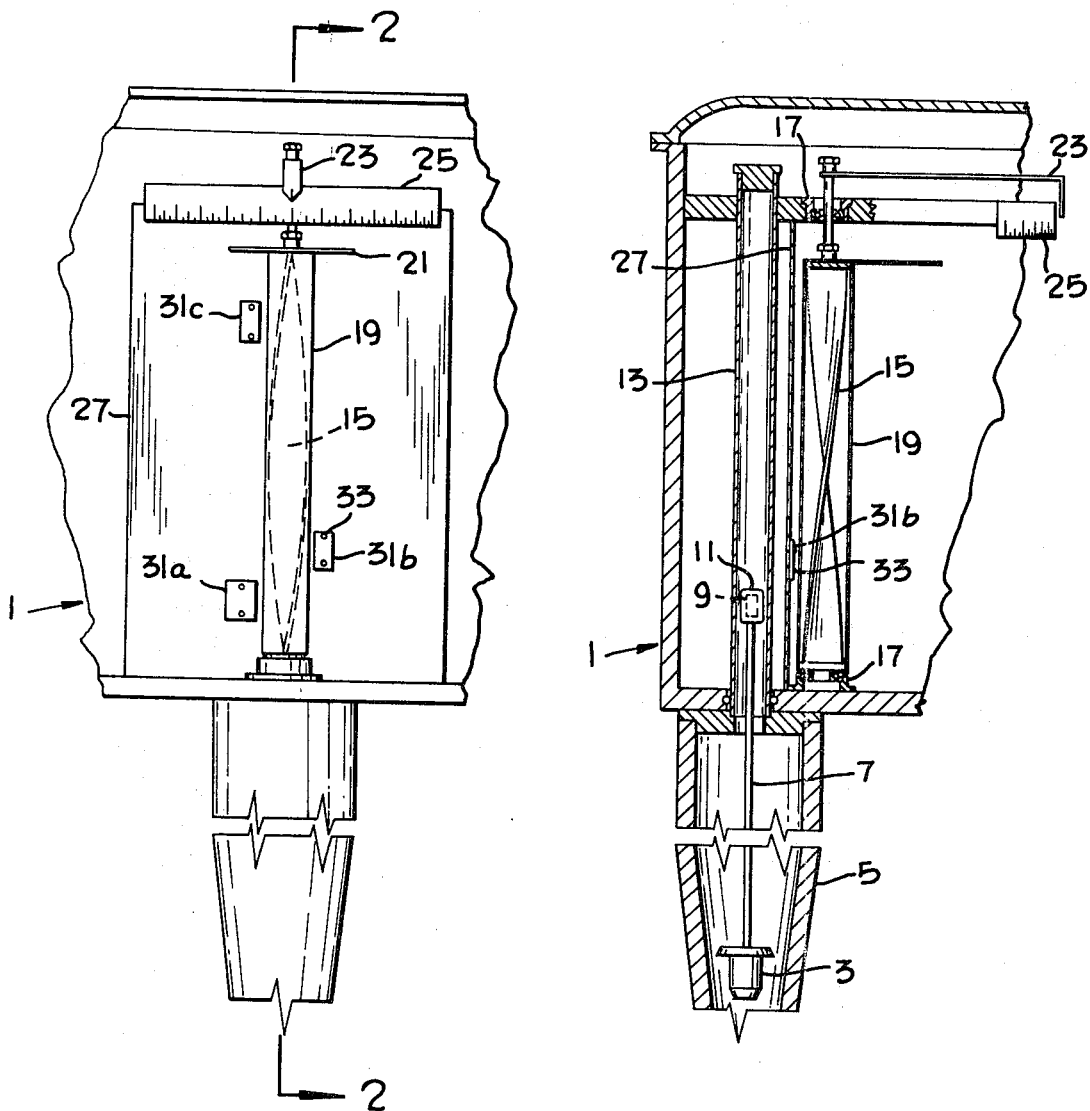

3,535,932
MEANS FOR NORMALIZING MAGNETIC FOLLOWER OUTPUT
William S. Ernest, Prospectville, Pa., assignor to Emerson Electric Co., St. Louis, Mo., a corporation of Missouri
Filed Sept. 24, 1968, Ser. No. 761,986
Int. Cl. G01f 23/12
U.S. Cl. 73—319                                                5 Claims

ABSTRACT OF THE DISCLOSURE

One or more magnetically permeable plates are positioned adjacent a helix type magnetic follower of an indicating device to linearize or otherwise normalize the output.

BACKGROUND OF THE INVENTION

This invention relates to indicating instruments of the type in which a magnet moves in response to a change in the condition being measured and a magnetic follower provides an output. Such devices are commonly used in fluid measuring instruments, such as variable area flow meters and instruments for measuring pressure, differential pressure or liquid level.

The construction of such devices typically includes a longitudinally movable rod, the position of which is indicative of a particular rate of flow, pressure, liquid level or other condition being measured. A magnet is operatively attached to the float, generally either embedded in the float itself or carried at the distal end of an extension rod attached to the float. A magnetic follower is mounted adjacent the magnet and moves in response to movement of the magnet. A particularly effective follower is a helically bent magnetically permeable strip mounted in a rotatable cylinder spaced a short distance from the line of travel of the magnet and having an axis of rotation parallel to the magnet's line of travel, although other followers are used. This type of follower converts a particular longitudinal position of the magnet to a particular rotational position of the helical follower. The follower, of whatever type, is in turn linked to an output device, which may be either local or remote. In its simplest form the output device is merely a pointer attached to the follower and an associated scale, but other devices such as pneumatic and electrical transducers also commonly provide an output.

In devices having a magnetic follower, as in any indicating device, it is important to provide an output which accurately reflects the condition being measured. Although it is possible to normalize the output at the output device, as for example by providing a non-uniform pointer scale or by pneumatic or electrical compensation, this is often expensive or inaccurate and also makes it more difficult to interchange the output device among various measuring instruments of the same, or differing, types. Therefore, it is highly desirable to provide a standard or "normalized" movement of the magnetic follower with respect to the magnitude of the condition being measured. Usually, it is desirable that the output be linear, that is, that the amount of rotation of the follower be the same for each increment of change in the magnitude of the condition being measured. However, it is sometimes desirable that the output be non-linear, either for convenience in reading the output device at particular magnitudes of the condition being indicated or for compatibility with particular output devices.

One of the objects to this invention is to provide a means for normalizing the output of an indicating device having a magnetic follower which is simple, inexpensive and permanent.

Other objects will occur to those skilled in the art in the light of the following description and accompanying drawing.

SUMMARY OF THE INVENTION

In accordance with this invention, generally stated, an indicating device is provided having a movable magnet which is displaced in response to changes in the magnitude of a condition being indicated, a follower which moves in response to displacement of the magnet and means for normalizing the movement of the follower with respect to the changes in the magnitude of the condition being indicated, which means include one or more pieces of magnetically permeable material mounted adjacent the follower.

BRIEF DESCRIPTION OF THE DRAWING

In the drawing, FIG. 1 is a view in front elevation of a variable area flow meter embodying the normalizing means of this invention; and
FIG. 2 is a sectional view taken along the line 2—2 of FIG. 1.

DESCRIPTION OF THE PREFERRED EMBODIMENT

Referring now to the drawings, reference numeral 1 indicates a variable area flow meter including one illustrative embodiment of normalizing means of this invention. The flow meter 1 includes a float 3 which moves in a housing 5. An extension rod 7 is attached to the top of the float 3. A permanent magnet 9 is sealed in a casing 11 at the upper end of the extension rod 7. The extension rod 7 and magnet 9 move freely longitudinally in a sealed tube 13.

Mounted adjacent the tube 13 is a helically shaped follower 15 rotatably mounted on a pair of bearings 17 for rotation around an axis parallel to the line of travel of the magnet 9. The helical follower 15 is formed of a thin strip of magnetically permeable material, such as soft iron, and is sealed in a cylinder 19 of non-magnetic material, such as aluminum. Attached to the upper end of the cylinder 19 are parts of a pair of output devices: a cam 21 which may form part of a transducer or an integrator, not shown, and a pointer 23 which, with a flow scale 25, provides an instantaneous local flow reading.

The helical follower 15, turns with movement of the magnet 9 in such a way that the narrow edge of the follower adjacent the longitudinal position of the magnet is always turned toward the magnet. A discussion of the theory and practice of this illustrative type of follower arrangement is found in U.S. Pat. No. 3,065,635 to George D. Keller.

An aluminum plate 27 is mounted between the tube 13 for the magnet 9 and the follower 15, perpendicular to the plane passing through the parallel axes of the tube 13 and follower 15. The line along which this plane intersects the plate 27 is hereinafter referred to as the "center line," for convenience. The plate 27 may be used to support a variety of associated equipment, not shown. Also mounted on the plate 27 are a plurality of flux diverting plates 31. The flux diverting plates 31 are made of a magnetically permeable material, such as soft iron, and are attached adjacent the follower 15 on either side of the center line.

The function of each of the flux diverting plates 31 is, as its name implies, to alter the shape of the magnetic field attracting the helical follower 15, thereby altering the rotational position of the follower slightly when the magnet 9 is in a longitudinal position near that of the flux diverting plate 31. It will be seen that because of the inverse square law the effect of each flux diverting plate 31 is, as a practical matter, limited to that part of the longitudinal movement of the magnet 9 in which the magnet is close to the flux diverting plate 31. It will also be noted that the extent to which the helical follower 15 is diverted away from a plate 31 becomes greater as the plate 31 is moved toward the center line. It will also be noted that the deflection of the follower 15 is virtually identical, but in the opposite direction, if a plate is placed on one side of the center line rather than the other.

Because of these characteristics it is relatively simple to linearize, or otherwise normalize, the rotational movement of the follower 15 with respect to the flow being measured, using standard techniques for preparing a plot of actual output against normal output and then experimentally positioning the flux diverting plates adjacent the longitudinal positions of the magnet 9 corresponding to points of deviation between the actual and normal output curves. By positioning the flux diverting plates 31 on either side of the center line, as dictated by whether the deviation from the normal curve is positive or negative, it is possible to correct each deviation of the actual output curve from the normal curve more or less independently. In the illustrative embodiment shown in the drawings, three flux diverting plates 31a, 31b and 31c were found experimentally to be required to linearize the output of the flow meter 1.

By using enough flux diverting plates which are properly proportioned and properly spaced from the center line, it is possible to adjust deviations of any shape and any magnitude to as close to the normal curve as desired. If some of the plates are placed longitudinally too close together, they may tend to interact. However, because this effect is limited to a small part of the output curve, it may often be used to advantage, or at least may easily be compensated.

Furthermore, the shape of the normalized output curve may be varied steplessly within very broad limits. The most usual use for this feature, of course, is to compensate for non-linearity of the longitudinal movement of the magnet 9 with respect to flow. However, other output curves may be fitted by use of the flux diverting plates.

It has been found that for most practical variable area flowmeter applications, regardless of the size of the flowmeter, three sizes of flux diverting plates, all $\frac{1}{32}''$ thick and $\frac{3}{4}''$ wide, and having lengths of $\frac{3}{4}''$, $1''$ and $1\frac{1}{4}''$, are sufficient to correct all rotational deviations up to plus or minus five degrees from normal.

When the flux diverting plates 31 have been adjusted experimentally to their appropriate positions, they are permanently attached to the aluminum mounting plate 27 by aluminum screws 33 through predrilled holes in the flux diverting plates 31.

Numerous variations in the normalizing means of this invention, within the scope of the appended claims, will occur to those skilled in the art in the light of the foregoing disclosure. Merely by way of example, although the magnetic follower described is a particularly effective one and is particularly well adapted for use with the normalizing means of this invention, the invention is also applicable to other indicating devices using different followers.

The flux diverting pieces may be made of other magnetically permeable material, such as carbon steel or magnetic stainless steel. The individual flux diverting plates may be of other shapes than rectangular. A single long flux diverting piece extending a substantial part of the length of the follower and placed on one or both sides of the follower may also be used. The shape of the output curve can then be varied steplessly simply by cutting the inner edge of the flux diverting strip to an appropriate shape. It will be readily appreciated that the proper shape may be cut automatically by pantographic or programmed translation of a plot of the deviation of actual output from the normal.

It may be found that for certain instruments sufficient accuracy can be obtained if only a few samples are first normalized by experimentally placing the flux diverting plates of this invention and thereafter all of the plates are secured in the same positions as those of the samples. For other applications, it may be desirable to provide the flux diverting pieces with some standard adjustable mounting, to allow final fine adjustment in the field.

These variations are merely illustrative.

Having thus described the invention, what is claimed and desired to be secured by Letters Patent is:

1. In an indicating device having a fixed structure, a movable magnet, said magnet being displaceable in relation to said fixed structure, said magnet being displaced in response to changes in the magnitude of a condition being indicated, and a follower, said follower being movable in relation to said fixed structure, said follower moving in response to displacement of said magnet, the improvement comprising means for normalizing the movement of said follower with respect to the changes in the magnitude of the condition being indicated, said means comprising at least one piece of magnetically permeable material mounted on said fixed structure in a position to alter the shape of the magnetic field of said magnet, hence to alter the movement of said follower in relation to said magnet, in a region of displacement of said magnet adjacent said piece of magnetically permeable material.

2. The device of claim 1 wherein said magnet is displaced longitudinally in response to changes in the magnitude of the condition being indicated, each longitudinal position of said magnet corresponding to a particular magnitude of the condition being indicated, and wherein said follower moves rotationally, each angular position of said follower corresponding to a particular position of said magnet.

3. The device of claim 2 including a float, said magnet being operatively attached to said float.

4. The device of claim 2 wherein said means comprise a plurality of plates, each of said plates having a length which is small compared with the total operative longitudinal displacement of said magnet.

5. The device of claim 4 wherein said plates are permanently secured to said fixed structure.

References Cited

UNITED STATES PATENTS

| | | | |
|---|---|---|---|
| 1,044,827 | 11/1912 | Smith | 310—190 |
| 1,027,684 | 5/1912 | Beede | 324—151 |
| 2,516,740 | 7/1950 | Young | 324—151 |
| 3,065,635 | 11/1962 | Keller | 73—319 |
| 3,133,441 | 5/1964 | Conkling | 73—210 |
| 3,155,792 | 11/1964 | Werts | 335—236 X |
| 3,260,110 | 7/1966 | Lutz | 73—319 X |

S. CLEMENT SWISHER, Primary Examiner

D. M. YASICH, Assistant Examiner

U.S. Cl. X.R.

73—210; 324—151